United States Patent [19]

Takahashi

[11] Patent Number: 4,620,242
[45] Date of Patent: Oct. 28, 1986

[54] APPARATUS FOR CONTROLLING A REVERSIBLE TAPE DRIVE IN A MAGNETIC TAPE PLAYER

[75] Inventor: Kozoh Takahashi, Kanagawa, Japan
[73] Assignee: Sony Corporation, Tokyo, Japan
[21] Appl. No.: 788,113
[22] Filed: Oct. 16, 1985
[30] Foreign Application Priority Data Oct. 20, 1984 [JP] Japan ................ 59-220720

[51] Int. Cl.⁴ .................... G11B 5/56; G11B 15/44
[52] U.S. Cl. ...................... 360/74.1; 360/76
[58] Field of Search ............... 360/71, 74.1, 76

[56] References Cited
U.S. PATENT DOCUMENTS 4,225,894 9/1980 Fulukawa et al. ............... 360/74.1

Primary Examiner—George G. Stellar
Attorney, Agent, or Firm—Lewis H. Eslinger; Alvin Sinderbrand

[57] ABSTRACT

A magnetic tape player having a tape drive device selectively operative to drive a tape in normal and reverse directions in a forward or playback mode of the tape player, is provided with a control apparatus for the tape drive which can selectively change-over between the normal and reverse directions of tape drive in the forward mode either automatically in response to detection of the tape end or manually, and which can further establish a stop mode of the tape player, for example, automatically in response to detection of the tape end, whereupon, the forward mode may be reestablished and, in that case, priority will always be given to drive of the tape in the normal direction.

16 Claims, 9 Drawing Figures

APPARATUS FOR CONTROLLING A REVERSIBLE TAPE DRIVE IN A MAGNETIC TAPE PLAYER

BACKGROUND OF THE INVENTION

1. Field of the Invention

This invention relates generally to magnetic tape players which have a mechanism for controlling the tape drive device so as to change the direction in which the tape is driven.

2. Description of the Prior Art

Various mechanisms have been proposed for use in cassette tape players to provide automatic reversing of the tape drive direction. Typically, the direction in which the tape is driven is automatically changed or reversed when the tape is completed unwound from the supply reel to the take-up reel during operation in the playback mode of the tape player. Further, manual changing of the direction of tape drive at some point before detection of the tape end during operation in the playback mode requires the addition of only a few relatively simple parts to such automatic reversing mechanisms. In general, a direction-changing button is mounted in such mechanisms so as to be manually operated for changing the tape drive from the normal direction to the reverse direction, and from the reverse direction to the normal direction, with both such direction changes occurring while the tape player remains in its playback mode established by the forward mode button being held in its operative or depressed position.

In the above mechanism, although the tape drive direction should be reciprocally changed whenever the direction-changing button is operated or the tape end is detected, it is also necessary, for the convenience of the operator, that the tape be driven in the normal direction whenever the forward mode button is initially operated or depressed while the tape player is in its stop mode. Therefore, regardless of the direction in which the tape was being driven before return to the stop mode, it is necessary that the tape be driven in the normal direction when the forward mode button is operated or depressed with the tape player in the stop mode. This requires in addition, a so called "priority device", for example, as disclosed, but not claimed, in co-pending U.S. patent application Ser. No. 06/652,571, filed Sept. 20, 1984, and having a common assignee herewith.

In the mechanism disclosed in the above-identified application, a gear which has an eccentric thereon rotates once through 360° to cause a change lever to move to-and-fro whenever the tape end is detected or the direction-changing button is operated. A slider for changing the tape drive device and a lock lever for locking the slider at one position are reciprocally moved by the to-and-fro movement of the change lever. When a forward mode button resumes its inoperative or inactive position in response to establishing of the stop mode, the lock lever is returned to its inoperative position for releasing the slider. Therefore, the above-mentioned "priority device" function is achieved in a relatively easy way.

However, the typical tape player of today is intended for portable use so that miniaturization of its size is of importance. It is not desirable in such portable tape players to provide a mechanism including a change lever moved to-and-fro whenever a change of tape direction is to occur because it results in wasting of space in the player, especially for the movement of a change lever with a slanted posture as described in the above-identified application.

Moreover, several attempts have been made to save space in a tape player by using a gear having a pair of diametrically opposed cutout portions or toothless gaps. For example, as shown in U.S. Pat. No. 3,976,263, which also has a common assignee herewith, an apparatus has been developed for controlling a tape drive device which, in its forward mode, can drive the tape only in a normal direction, and which has a change member movable between first and second positions in response to each turn of a gear through 180°. Although it may be possible to apply this type of gear to the existing mechanism for changing the tape drive direction in the playback mode, substantial modification of such mechanism is required, particularly in achieving the above-mentioned "priority device" function without undesirably increasing the space required therefor in the tape player.

OBJECTS AND SUMMARY OF THE INVENTION

Accordingly, it is an object of the present invention to provide a mechanism for controlling a tape drive device in a magnetic tape player so as to change the direction in which a tape is driven, and which can satisfy the above-noted requirements.

Another object of the present invention is to provide an improved mechanism for changing the direction of the tape drive, as aforesaid, and which has a "priority device" function, that is, can operate to drive a tape in the normal direction when the forward mode button is initially operated with the tape player in its stop mode regardless of the direction in which a tape was driven before the stop mode was established.

A further object of the present invention is to provide an improved mechanism for changing the direction of tape drive that can be employed in a portable tape player and can provide automatic and manual reversing operation in the playback mode.

In accordance with one aspect of the present invention, an apparatus for controlling a tape drive device in a magnetic tape player so as to change the direction of tape drive comprises a cam gear having a pair of diametrically opposed toothless portions or gaps in its periphery, a driving gear engageable with the cam gear to turn the cam gear through 180° upon each such engagement thereof, and a pair of stopper projections on the cam gear which are selectively engageable with a lock or latch member to position the cam gear with one of its gaps facing the driving gear. A pair of diametrically opposed, radially enlarged cam portions and an eccentric cam member are also provided on the cam gear. In order to initially turn the cam gear when the latch member is released from engagement with one of the stopper projections, bias spring means acts against one of the radially enlarged cam portions when one of the toothless portions of the cam gear faces the driving gear. A change lever is mounted to move between first and second positions for selecting the normal and reverse directions, respectively, of the tape drive. A cam follower member and a spring-loaded lock arm are both pivotally mounted on the change lever, with the cam follower member contacting the eccentric cam member, and the spring-loaded lock arm being movable to its operative position for locking the cam follower member at a fixed angle relative to the change lever in response to actuation of a mode selecting lever for establishing the forward or playback mode. When the cam follower member is locked relative to the change lever, the latter is moved from one to another of its first and second positions for changing the direction in which the tape is driven in response to each turn of the cam gear through 180°. When the cam follower member is pivoted in response to initial rotation of the eccentric cam member without being secured at the fixed angle relative to the change lever by the lock arm, for example, when the forward mode is established after the stop mode, the change lever remains at rest and the cam follower member releases the latch member from engagement with one of the stopper projections and permits further turning of the cam gear during which the cam follower member is locked relative to the change lever and the resulting pivotal movement of the change lever causes driving of the tape in the normal direction for the forward mode established from the stop mode. In other words, the change lever is moved reciprocally between first and second positions for changing the direction in which the tape is driven only when the cam follower member is locked by the spring-loaded lock arm in a fixed angular position relative to the change lever.

The above, and other objects, features and advantages of the present invention will become apparent from the following detailed description of an illustrative embodiment thereof to be read in conjunction with the accompanying drawings.

DETAILED DESCRIPTION OF A PREFERRED EMBODIMENT

Figure 1:
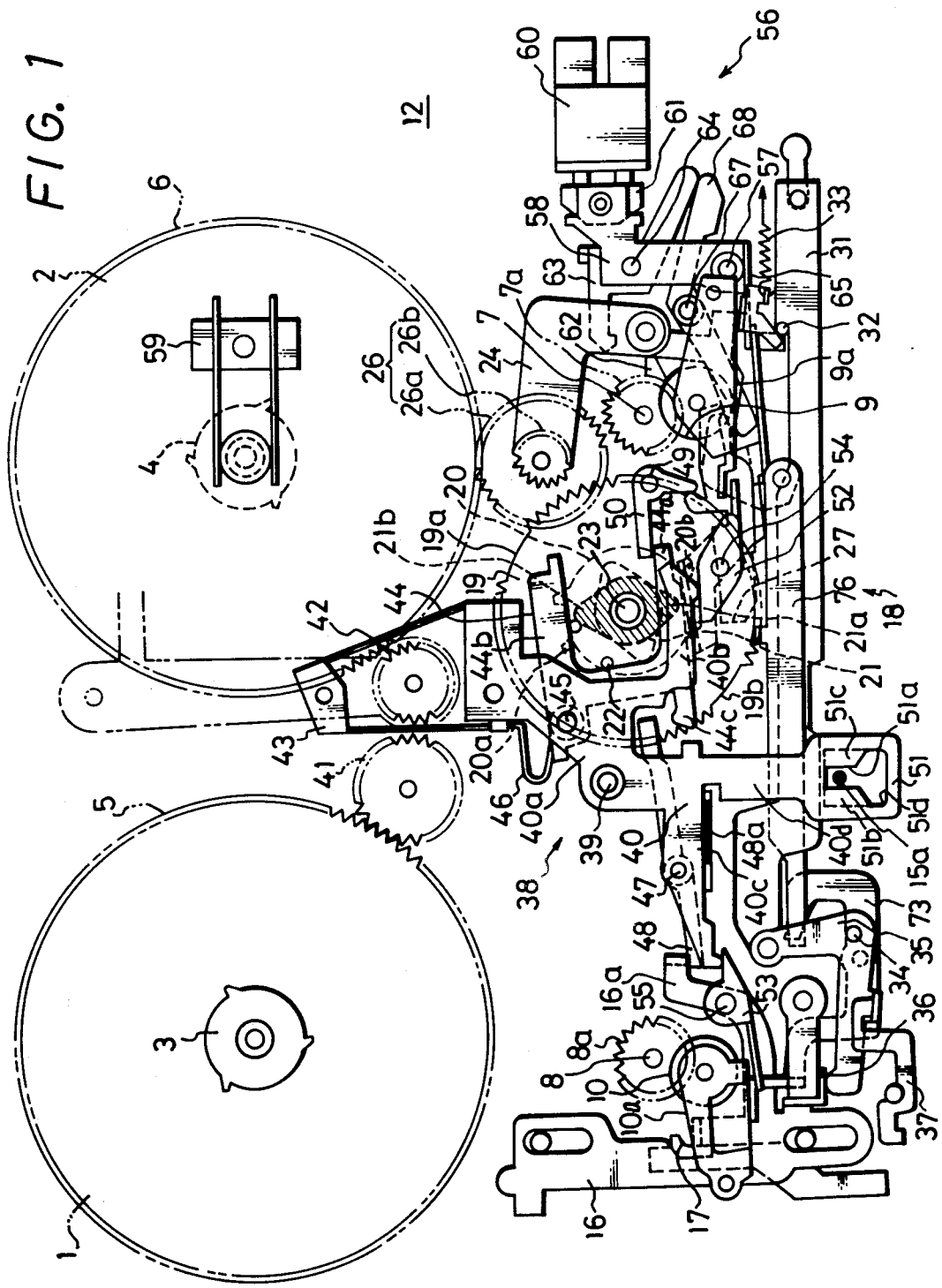
FIG. 1 is a plan view of a tape player having a mechanism according to one embodiment of the present invention for controlling the tape drive, and which is shown in the stop mode of the player.

Referring now to FIG. 1, it will be seen that, in the illustrated tape player, a pair of reel tables 1 and 2 are suitably rotatably mounted, and reel spindles 3 and 4 are coupled to tables 1 and 2, respectively, as by clutch devices (not shown), so as to rotate therewith. Reel gears 5 and 6 are formed on peripheries of tables 1 and 2. Capstans 7 and 8 are also rotatably mounted at suitable different locations for cooperation with pinch rollers 9 and 10 on pivoted support arms 9a and 10a which are selectively moved to contact with the respective one of capstans 7 and 8 so as to drive a tape in the normal or reverse direction, respectively.

Figure 2:
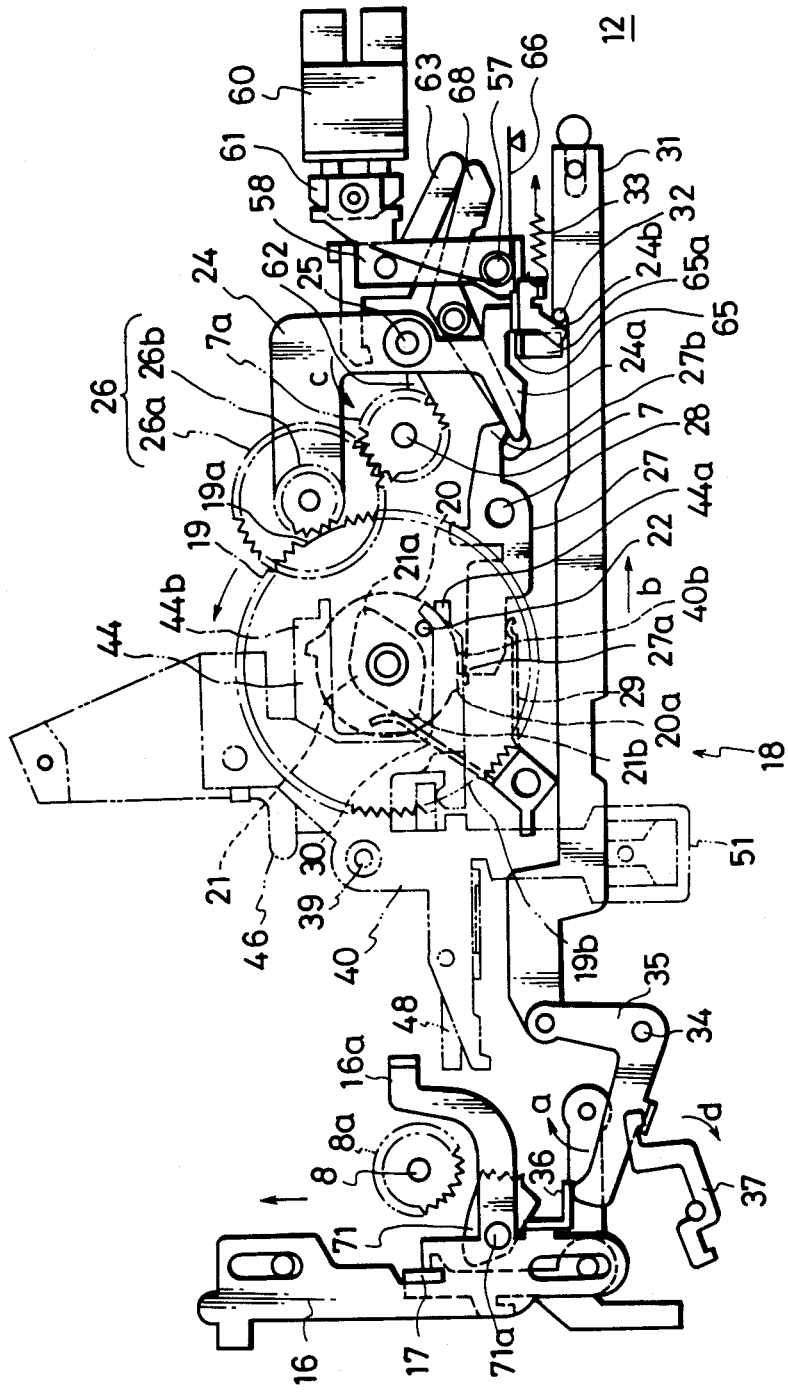
FIG. 2 is a plan view similar to that of FIG. 1, but with a number of the elements removed to more clearly show the condition of the remaining elements with the tape player in its forward mode and arranged for driving the tape in the normal direction.

A forward lever 16 is moved in the direction of the arrow on FIG. 2 in response to actuation of a forward button (not shown), and is held in its operative position by a lock plate 17. A forward mode selecting mechanism 18 will now be described in detail with reference to FIG. 2 in which a cam gear 19 is shown to have a pair of toothless portions or gaps 19a and 19b on its periphery displaced 180° from each other. Cam gear 19 has a first cam surface 20 and a second cam surface 21 formed integrally therewith on one side of cam gear 19. A cam pin 22 extends from the other side of cam gear 19 at an eccentric position. As shown most clearly on FIGS. 4 and 5, cam surface 20 has a pair of diametrically opposed stopper projections 20a and 20b, and second cam surface 21 is generally diamond shaped to present opposed pointed surface portions 21a and 21b which are radially aligned with toothless portions 19a and 19b, respectively. Cam gear 19 is rotatably mounted on a fixed axle 23.

Figure 4:
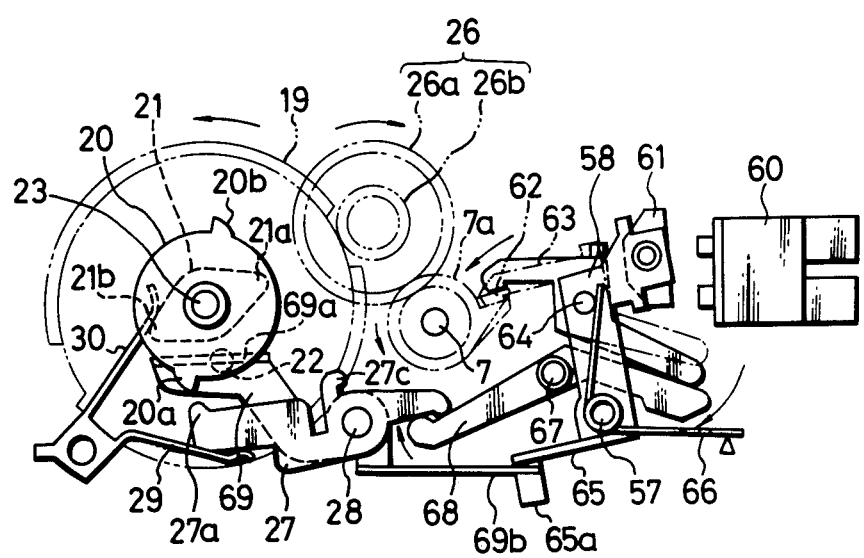
FIGS. 4 and 5 are enlarged, fragmentary plan views showing elements of FIGS. 1 and 2 constituting an automatic mechanism for changing the direction of the tape drive at the tape end.

Returning to FIG. 2, it will be seen that a pivot lever 24 is pivotably mounted intermediate its ends on a fixed pivot pin 25, and a driving gear 26 is rotatably mounted on one end of lever 24 adjacent cam gear 19. Driving gear 26 includes a first gear 26a of relatively large diameter engageable with a flywheel gear 7a integral with capstan 7, and a second gear 26b of relatively small diameter which is engageable with cam gear 19. The other end portion of pivot lever 24 is branched to provide a first arm 24a and a second arm 24b. A lock lever or latch member 27 is pivotably mounted on a fixed pin 28. A claw 27a is formed at one end of lock lever 27 to engage with one of stopper projections 20a or 20b, and the other end 27b of lever 27 is in contact with first arm 24a of pivot lever 24 (FIG. 2). One actuator arm 29 of a forked spring engages lock lever 27 and urges the latter in the clockwise direction for contact of claw 27a with the periphery of first cam surface 20, and another arm 30 of the forked spring is in contact with the periphery of second cam surface 21 (FIGS. 2 and 4). Pivot lever 24 is urged to turn in the counter-clockwise direction by a spring 33, so that second arm 24b thereof contacts with a pin 32 extending from a transversely movable slider 31. An end of slider 31 is connected to one end of an L-shaped lever 35 which is pivotably mounted on a fixed pin 34. The other end of L-shaped lever 35 is in contact with a bent portion 36 of forward lever 16 (FIG. 2). A pivotally mounted direction-change lever 37 is adapted to be turned in the direction of arrow d on FIG. 2 in response to manual actuation of a direction-change button (not shown) when the operator wants to change the direction of the tape drive before the tape end is detected during operation in the playback mode.

Figure 3:
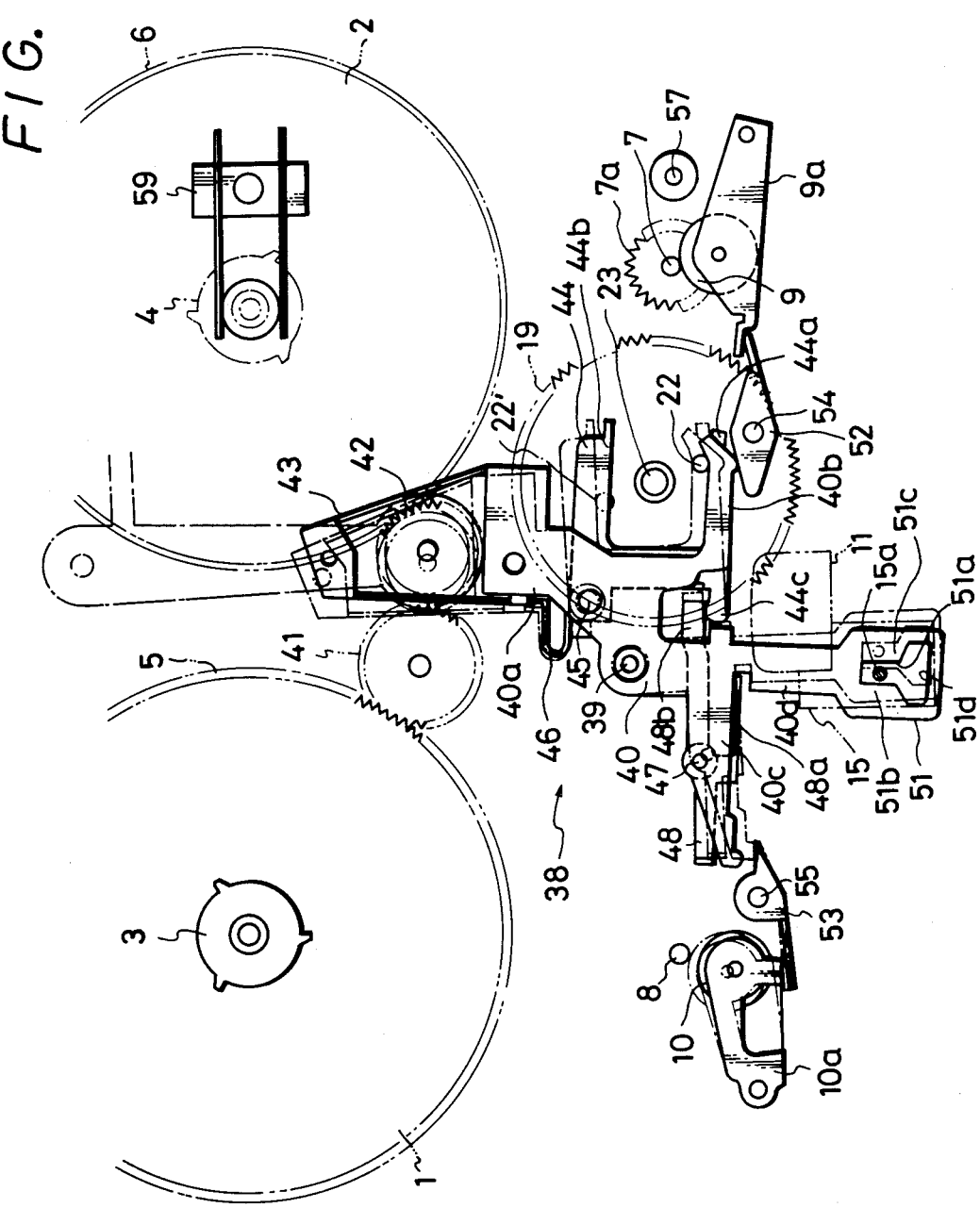
FIG. 3 is another plan view similar to that of FIG. 1, but with a number of the elements removed to better illustrate the movements effected for changing the direction of the tape drive from the normal direction to the reverse direction while the tape player is in its forward or playback mode.

A tape drive mechanism 38 is shown in FIG. 3 to comprise a change lever 40 which cooperates with the above-described forward mode selecting mechanism 18 to selectively rotate one of reel tables 1 and 2 and to selectively move one of pinch rollers 9 and 10 to engage with the respective one of capstans 7 and 8. The change lever 40 is also operative to change an azimuth adjust device 15 (which will be described later with reference to FIGS. 8 and 9).

Figure 7:
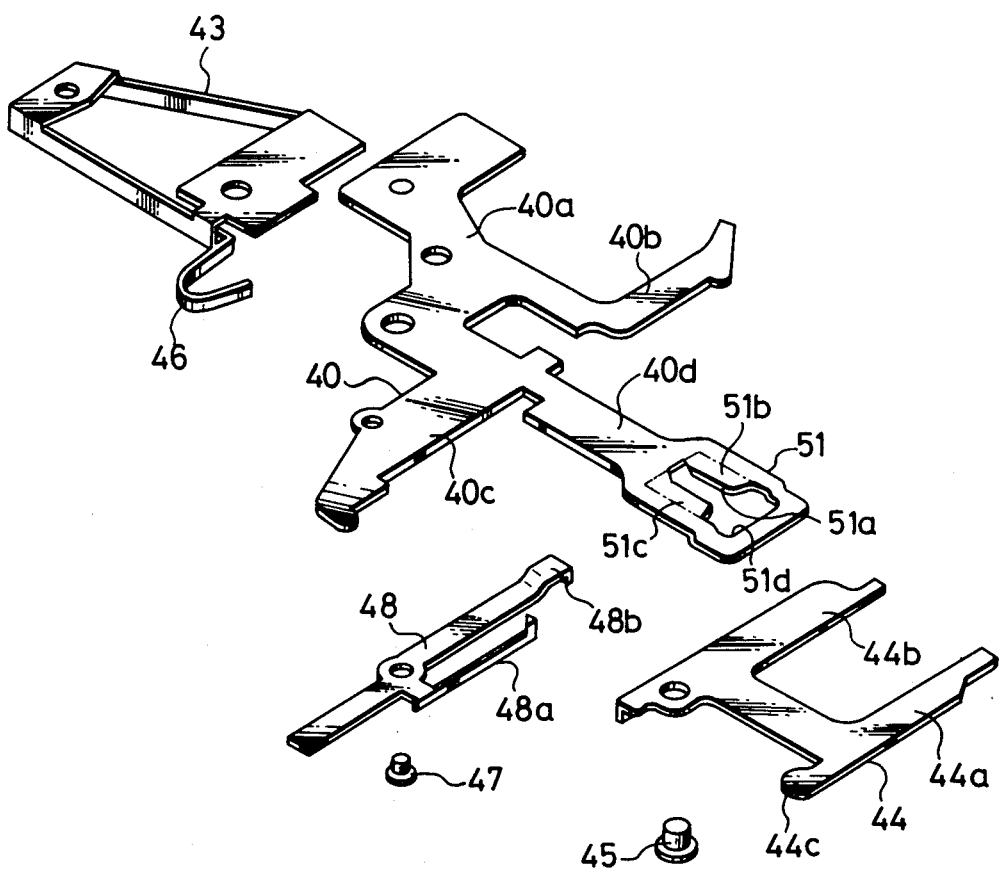
FIG. 7 is an exploded perspective view of a change lever, a spring frame, a cam follower member and a spring-loaded lock arm provided in accordance with the invention, and which are shown disassembled from each other.

Change lever 40 is pivotably mounted on a fixed pin 39, and a spring frame 43 is attached to one end portion 40a of lever 40 to move a pulley gear 42 into selective engagement with reel gear 6 or with an intermediate gear 41 which is always meshed with reel gear 5. A U-shaped cam follower lever 44 (FIG. 7) is pivotably mounted on change lever 40 by a rivet pin 45 (FIG. 3) and is urged to rotate in the counterclockwise direction in FIG. 3 by a plate spring 46 extending from spring frame 43. A lock-arm 48 having an extended spring portion 48a is also pivotably mounted on change lever 40 by a rivet pin 47, and is biased by spring portion 48a in the clockwise direction in FIG. 3 so as to cause a bent portion 48b of lock arm 48 to hold a claw 44c on lever 44. Therefore, against the force of plate spring 46, cam follower lever 44 is locked by lock arm 48 in a fixed position relative to change lever 40 where one arm 44a of cam follower lever 44 is overlapped by an extended arm 40b on change lever 40. FIG. 7 shows details of change lever 40, spring frame 43, cam follower lever 44 and lock arm 48 disassembled from each other.

A bell-crank lever 50 is shown in FIG. 1 to be rotatably mounted on a fixed pin 49, and to be actuable at one end by arm 44a so that the other end of bell-crank lever 50 acts on a nose 27c of lock lever 27. Therefore, claw 27a of lock lever 27 is moved away from one of projections 20a or 20b, when cam follower lever 44 is pivoted in the counterclockwise direction. On the other hand, lock arm 48 is turned in the counterclockwise direction against the force of its spring arm 48d by an end 16a of an arm extended from forward lever 16 when the latter is in its inoperative position as shown in FIG. 1.

When change lever 40 is turned in the clockwise direction around pin 39, extended arm 40b causes an intermediate lever 52 pivoted on a pin 54 to rock in a counterclockwise direction (FIG. 3) by which pinch roller 9 is moved against capstan 7 to establish the forward mode with the tape being driven in the normal direction. On the other hand, when change lever 40 is turned in the counterclockwise direction, extended arm 40c angularly moves an intermediate lever 53 about a pivot pin 55 in the clockwise direction so that pinch roller 10 is moved by lever 53 into contact with capstan 8 to drive the tape in a reverse direction while the player remains in its forward mode.

In the stop mode of the tape player, both pinch roller support arms 9a and 10a are conventionally spring urged in the directions moving pinch rollers 9 and 10 away from capstans 7 and 8 and arms 9a and 10a urge both intermediate levers 52 and 53 into contact with arms 40b and 40c, respectively, so that change lever 40 is held in its neutral position. In this mode, pulley gear 42 is positioned away from reel gear 6 and intermediate gear 41, and, as noted above, pinch rollers 9 and 10 are positioned away from capstans 7 and 8.

Figure 5:
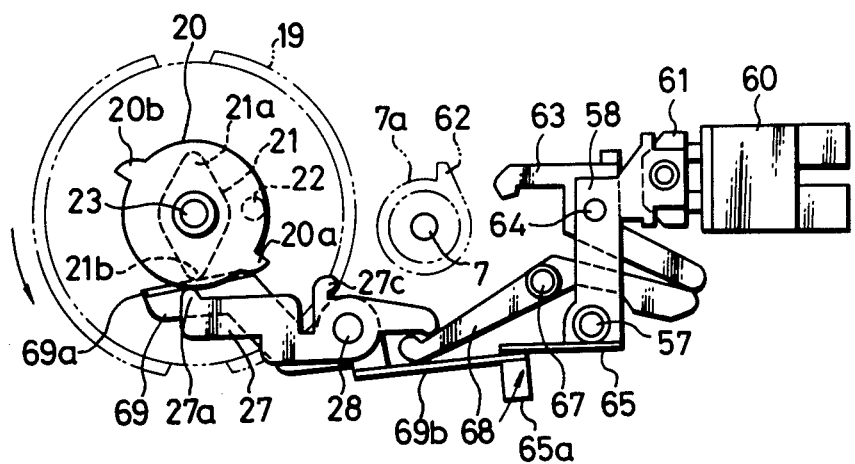

An automatic mechanism 56 which operates to detect a tape end is shown in FIGS. 1,3,4 and 6 to comprise a solenoid 60 which is suitably energized momentarily at a time when reel gear 6 stops rotating to cause interruption of a signal from a switch 59 associated with spindle 4. An armature 61 formed of a permanent magnet is attracted to the core of solenoid 60 when the latter is de-energized, as on FIGS. 1 and 2. A magnetic field is momentarily generated by a core of solenoid 60 in response to energizing of the latter and acts to drive armature 61 away from solenoid 60 so that a control lever 58 pivoted on a fixed pin 57 and connected to armature 61 can then be rotated in the counterclockwise direction by the force of a torsion spring 66. The spring 66 is mounted on fixed pin 57 and acts, at its ends, against the chassis and a pin 65 on lever 58 (FIG. 4). Rotation of control lever 58 in the counterclockwise direction causes an end of a kick lever 63 pivoted on pin 64 to be moved to the position shown by dotted lines in FIG. 4, and in which kick lever 63 extends into the orbit of a projection 62 extending radially from the hub of flywheel gear 7a rotating with capstan 7. Therefore, kick lever 63 is angularly propelled by projection 62 in the clockwise direction about pin 64, and an intermediate lever 68 pivoted on a fixed pin 67 is turned in the clockwise direction by kick lever 63 and turns lock lever 27 in the counterclockwise direction so that claw 27a thereof is moved away from stopper projection 20a or 20b against the force of spring arm 29. A return lever 69 is rotatably mounted on pin 28 to return control lever 68 to its initial position in which armature 61 engages the core of solenoid 60 (FIG. 5). More particularly, a cam follower wall 69a formed at an end of return lever 69 is acted upon by one of the pointed surface portions 21a and 21b of cam 21 upon rotation of cam gear 19, as shown in FIG. 5. Another end 69b of return lever 69 is received by a bent portion 65a formed from a wall 65 on control lever 58.

Figure 6:
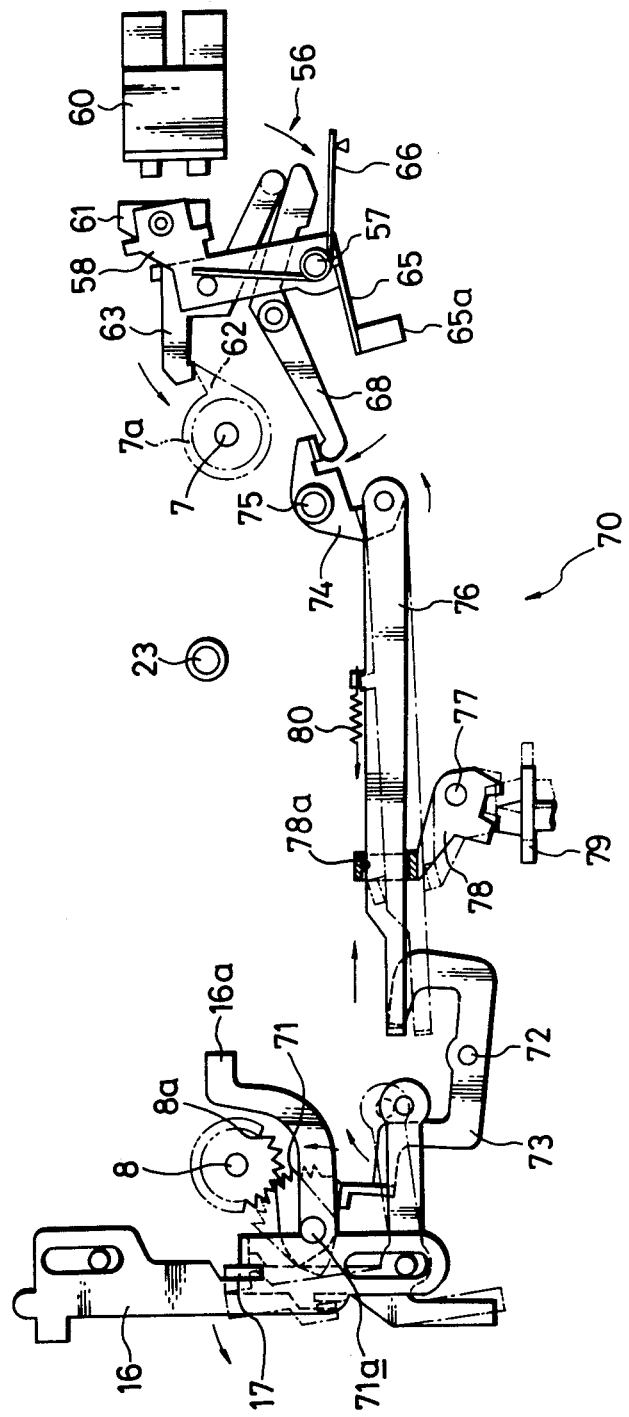
FIG. 6 is a plan view of an automatic mechanism for stopping the driving of the tape at the tape end, that is, for automatic change-over to the stop mode from the playback mode of the player.

An automatic shut-off mechanism 70 which automatically operates to establish a stop mode of the tape player upon detection of the tape end will now be described with reference to FIG. 6. A shut-off gear segment 71 is pivotally mounted on a pin 71a carried by forward lever 16 and is urged angularly by a spring (not shown) to move to the position shown on FIG. 2, that is, away from a flywheel gear 8a which is formed around and rotatable with capstan 8. A lever 73 which is pivoted on a pin 72 on the chassis is in contact with shut-off gear segment 71 at one end thereof (FIG. 6). A crank lever 74 is pivotally mounted on a fixed pin 75, and has one end pivotally connected to a slider 76. A spring 80 urges slider 76 toward the left in FIG. 6 so that the other end of crank lever 75 is urged downwardly into contact with intermediate lever 68. A select lever 78 is pivotally mounted on a fixed pin 77 and is rocked by a slide knob 79 between a first position shown by solid lines and a second position shown by dotted lines in FIG. 6. Select lever 78 provides a guide 78a for slider 76 so that, in response to displacement of lever 78 to its first and second positions, slider 76 is disposed in an operative position shown by solid lines or in an inoperative position shown by dotted lines. When slider 76 is in its operative position, the end thereof remote from crank lever 74 is engageable with lever 73. In that case, when mechanism 56 detects a tape end, the movement of its intermediate lever 68 against crank lever 74 causes slider 76 to move toward the right for rocking lever 73 in a clockwise direction to move shut-off gear 71 into meshing engagement with flywheel gear 8a, as shown on FIG. 6.

Figure 8:
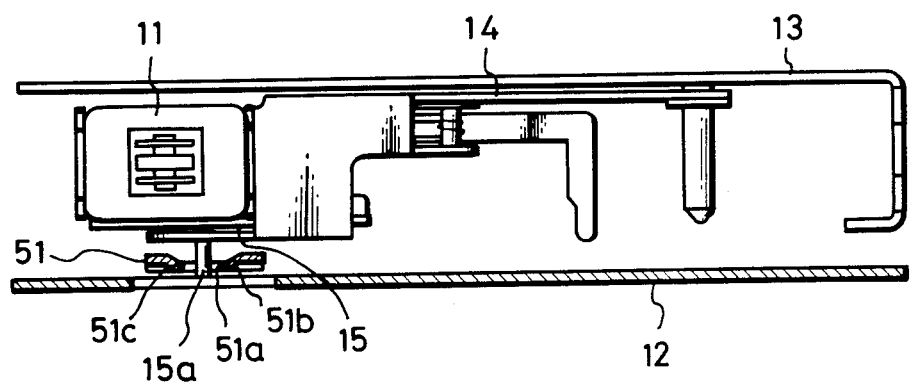
FIG. 8. is an elevational view of a magnetic head and its supporting structure in a cassette holder of a tape player according to the invention.
Figure 9:
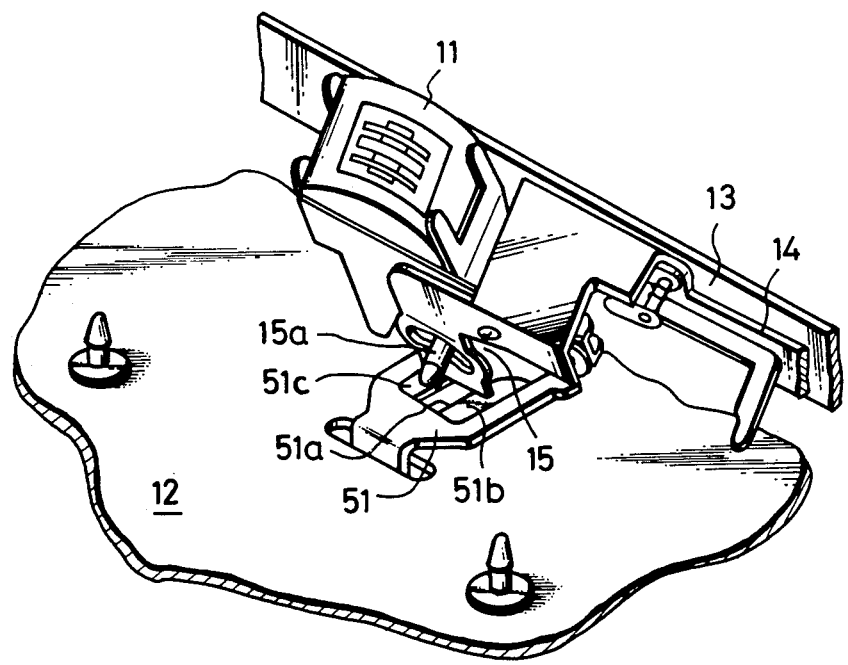
FIG. 9 is a perspective view of the elements shown in FIG. 8 but with the cassette holder shown in a tilted or open position.

Referring now to FIGS. 8 and 9, a cassette holder 13 is there shown and is pivotally supported on a chassis 12 by a suitable pivot structure (not shown) so as to be manually movable from a closed position shown in FIG. 8 to an opened or tilted position at which a tape cassette can be inserted or removed. A base plate 14 is pivotally mounted in cassette holder 13 so that a magnetic head 11 supported on base plate 14 can be moved to different positions for the playback mode and stop mode of the player. Although the detailed structure thereof is not shown in the drawings, an azimuth adjust mechanism 15 is provided between magnetic head 11 and base plate 14. As is well-known, an azimuth angle of a magnetic tape path will change slightly in accordance with a change in the direction in which the tape is running. Therefore, in response to changes in the position of a control pin 15a, adjust mechanism 15 acts to slightly change the azimuth angle of magnetic head 11. To change the position of control pin 15a, an actuator portion 51 is formed at the end of an arm 40d of change lever 40 (FIGS. 7-9). More particularly, actuator portion 51 is shown to include a pair of inclined plates 51b and 51c, between which there is defined a slot 51a in which control pin 15a is inserted in the closed position of cassette holder 13 (FIG. 8).

The operation of the above-described embodiment of the invention is as follows:

For establishing a forward mode with the tape driven in the normal direction, forward lever 16 is moved from the position shown in FIG. 1 to its operative position shown in FIG. 2 and in which it is retained by lock plate 17. By such movement of forward lever 16, a switch (not shown) is suitably turned ON for operating a motor by which capstans 7 and 8 and pulley gear 42 are rotated. Further magnetic head 11 is suitably moved into a tape cassette inserted in cassette holder 13. At the same time, in response to movement of forward lever 16 to its operative position, L-shaped lever 35 is turned in the direction of the arrow a, slider 31 is moved in the direction of the arrow b, and pivot lever 24 is turned in the direction of the arrow c on FIG. 2, with all of these movements being powered by spring 33 connected to lever 24. As a result of such movement of lever 24, large gear 26b is meshed with flywheel gear 7a which is rotating together with capstan 7. Since a toothed portion of cam gear 19 faces driving gear 26 when the player is in its stop mode, as shown on FIG. 1, small gear 26a drives cam gear 19 to rotate the latter at the initiation of the forward mode. When cam gear 19 is rotated to a certain angular position shown in FIG. 2, claw 27a of lock lever or latch member 27 contacts with stopper projection 20a to stop cam gear 19 and keep it at this position where a toothless portion or gap 19a faces small gear 26b.

During such turning of cam gear 19 to that predetermined or certain angular position, pin 22 of cam gear 19 pushes against the side surface on extended arm 40b of change lever 40, whereby change lever 40 is turned in the clockwise direction around pin 39 in FIG. 3. Therefore, pulley gear 42 is moved by spring frame 43 so as to engage with reel gear 6, and intermediate lever 52 is rocked by extended arm 40b in the counterclockwise direction in FIG. 3 so as to cause pinch roller 9 to contact with capstan 7. Further, control pin 15a shown in FIG. 8 is moved to the left by actuator portion 51 of change lever 40 to adjust magnetic head 11 to the posture corresponding to the normal direction of tape movement. Thus, establishment of the forward mode in the normal direction is completed.

The operation for manually changing the direction in which the tape is driven will now be described.

When a direction button (not shown) is operated at any time during operation in the forward mode with the tape being driven in the normal direction, direction changing lever 37 (FIG. 2) is turned in the direction of the arrow d. As a result thereof, L-shaped lever 35 is rotated in the counterclockwise direction opposite to arrow a, and slider 31 is moved in the direction opposite to arrow b. Pin 32 on slider 31 pushes arm 24b of pivot lever 24 so as to turn it in the direction opposite to the arrow c against the force of spring 33. Therefore, arm 24a of lever 24 pushes end 27b of lock lever 27 to turn the latter in the counterclockwise direction around pin 28. Accordingly, claw 27a moves away from stopper projection 20a and then actuator arm 30 of the forked spring in contact with pointed surface portion 21b of cam 21 can turn cam gear 19 slightly to move gaps 19a away from gear 26a.

Upon release of the manual pressure from the direction button (not shown), direction lever 37 can rock in the direction opposite to arrow d on FIG. 2. Then, L-shaped lever 35, slider 31 and pivot lever 24 can be respectively moved in the directions of the arrows a,b and c by the force of spring 33. In response to such movement of pivot lever 24, small gear 26a is meshed with cam gear 19 again and drives it to turn through a certain angle, that is, until stopper projection 20b is engaged by claw 27d and toothless portion 19b of gear 19 faces small gear 26a.

As shown in FIG. 3, during such turning of cam gear 19, eccentric pin 22 thereon moves from the position shown in solid lines to the position shown in dotted lines at 22'. At this time, cam follower lever 44 is locked by lock arm 48 and unable to pivot around pin 45 relative to change lever 40. Therefore, when eccentric pin 22, in moving to the position 22', pushes against arm 44b of lever 44, change lever 40 is turned in the counterclockwise direction around pin 39, so that pulley gear 42 is moved to the left by spring frame 43 so as to engage gear 42 with intermediate gear 41. Such turning of change lever 40 further causes rocking of intermediate lever 53 in the clockwise direction about pin 55 by means of arm 40c so as to cause pinch roller 10 to contact capstan 8, and control pin 15a is moved to the right by actuator portion 51 of change lever 40 to adjust magnetic head 11 to the posture corresponding to tape drive in the reverse direction. Changing of the direction of tape drive from the normal to the reverse direction is thereby completed.

The above-described direction-changing operation may be manually initiated any time before the tape end is detected during operation in the forward mode with the tape being driven in either direction. However, upon the detection of the tape end, the direction-changing operation is automatically performed as described below in conjunction with FIGS. 4 and 5. As previously mentioned, solenoid 60 is momentarily energized when reel gear 6 stops rotating and, as a result thereof, the signal from switch 59 (FIG. 3) no longer appears. The magnetic field momentarily generated from the core of solenoid 60 acts to drive armature 61 away from solenoid 60 so that control lever 58 is turned in the counterclockwise direction by the force of spring 66. In response to such turning of control lever 58, the end of kick lever 63 is moved to the position shown by dotted lines in FIG. 4, and in which it projects into the orbit of projection 62. Thereupon, kick lever 63 is turned about pin 64 in the clockwise direction to the position shown in full lines on FIG. 4 by the action of projection 62, and intermediate lever 68 is rocked in the clockwise direction by lever 63 so that claw 27a of lock lever 27 is moved away from stopper projection 20a or 20b against the force of spring arm 29. Then, cam gear 19 is slightly rotated by the force of spring arm 30 on cam 21 and gear 19 is meshed with small gear 26b which remains in the position shown in dotted lines in FIG. 4. Thereafter, the same operations as previously described will be performed for changing the direction of tape drive from the normal direction to the reverse direction.

During the turning of cam gear 19 by which the change of the tape drive direction is effected, cam follower wall 69a of return lever 69 is pushed by pointed surface portion 21b or 21a of cam 21 so that arm 69b moves in the direction of the arrow on FIG. 5 and acts against wall 65 of control lever 68 for turning the latter clockwise about pin 57. When control lever 58 is thereby moved back to its initial position shown in FIG. 5 against the force of spring 66, magnetized armature 61 will again be in contact with the core of solenoid 60 so as to hold kick lever 63 out of the orbit of projection 62.

For the above described automatic changing mode of operation, slide knob 79 should be located at the position indicated in dotted lines on FIG. 6 to move the free end of slider 76 downwardly away from engagement with lever 73. The further change of the tape direction from the reverse direction back to the normal direction can be effected by manual actuation of direction lever 37 before detection of the tape end, or by automatic operation upon detection of the tape end with the player in its forward mode and the tape being driven in the reverse direction.

The automatic shut-off operation for changing the player from its forward mode with the tape being driven in the normal or reverse direction to the stop mode upon the detection of the tape end is as follows:

To achieve this automatic shut-off operation, slide knob 79 is preset in the position shown in solid lines in FIG. 6.

The momentary energizing of solenoid 60, and the movement of armature 61, control lever 58, kick lever 63, and intermediate lever 68 upon the detection of the tape end are exactly the same as previously mentioned in the description of the automatic reversing operation. Thus, upon detection of the tape end, crank lever 74 is turned in the counterclockwise direction about pin 75 so that slider 76 is moved to the right against the force of spring 80. Lever 73, being engageable with the end of slider 76, is turned in the clockwise direction about pin 72 so as to push shut-off gear segment 71 into meshing engagement with flywheel gear 8a. Shut-off gear segment 71 rotated further by flywheel gear 8a acts to kick lock plate 17 to its inoperative or released position, so that forward lever 16 is free to be returned to its inoperative position (FIG. 1) by a return spring (not shown).

Such return of forward lever 16 to its inoperative position from the condition shown in FIG. 2, causes turning of L-shaped lever 36 in the direction opposite to arrow a, and slider 31 is thereby moved in the direction opposite to arrow b, whereupon lever 35 and slide 31 are retained in the positions shown on FIG. 1 and which are characteristic of the stop mode. The pin 32 on slide 31 acts against arm 24b of pivot lever 24 to turn the latter in the direction opposite to the arrow c on FIG. 2 to the position shown on FIG. 1 which is characteristic of the stop mode. In the such position of pivot lever 24, driving gear 26 is held away from cam gear 19 and flywheel gear 7a. Therefore, even though flywheel gear 7a is rotated in the fast-forward and rewind modes of the player, the retention of pivot lever 24 in the position of FIG. 1 for such modes ensures that cam gear 19 will not be rotated.

When pivot lever 24 is turned to the position of FIG. 1 for the stop mode, arm 24a in contact with the end 27b of lock lever 27 moves the latter in the counterclockwise direction around pin 28 to keep claw 27a away from stopper projection 20a or 20b in the stop mode. Upon releasing claw 27a from stopper projection 20a or 20b, cam gear 19 is slightly turned by the force of spring arm 30 against pointed surface 21a or 21b, so that a toothed portion of cam gear 19 will face small gear 26b and change lever 40 will be moved to its neutral position because cam pin 22 will be moved away from arm 40b. In response to the movement of change lever 40 to its neutral position, pulley gear 42 will be held in an inoperative position (FIG. 1) where gear 42 is out of engagement with both reel gear 6 and intermediate gear 41, and both pinch rollers 9 and 10 will be located away from capstans 7 and 8, respectively, in the stop mode. Further, the movement of slide 31 to its stop mode position causes pin 32 thereon to push bent portion 65a of control lever 58 for pivoting the latter against the force of spring 66 and thereby returning magnetized armature 61 to contact with a core of solenoid 60.

Finally, the operation of the above-described embodiment of the invention in achieving the function of a "priority device" will be described. By reason of such "priority device" function, the tape is driven in the normal direction whenever the forward mode button is actuated with the player in its stop mode, regardless of whether the tape was being driven in the normal or reverse direction before the stop mode was established. As previously mentioned in the description of the automatic shut-off mode, when forward lever 16 is returned to its inoperative position from the condition shown in FIG. 2, which shows the forward mode with the tape driven in the normal direction, cam gear 19 is slightly rotated by the force of spring arm 30, and change lever 40 is moved to its neutral position. In this stop mode, because lock arm 48 is rocked to its inoperative position by the return (or downward) movement of the end 16a of forward lever 16, cam follower lever 44 is also slightly turned by the force of spring 46.

When forward button is actuated again with the player in the stop mode, eccentric pin 22 on cam gear 19 will act, in response to turning of the latter, to push arm 44b of cam follower lever 44. Even though lock arm 48 will return to its operative position upon the movement of the end 16a of forward lever 16 coincident with movement of the latter to its operative position (FIG. 2), cam follower lever 44 will not be locked relative to change lever 40 by lock arm 48, but will be pivoted about pin 45 relative to change lever 40 which will therefor remain in its neutral position. Accordingly, no change will occur in the tape drive mechanism 38. However, crank lever 50 (shown in FIG. 1) will be rocked by the pivoted movement of arm 44a and will act on nose 27c of lock lever 27 so as to cause claw 27a to move away from stopper projection 20b.

Upon further turning of cam gear 19 by small gear 26b, eccentric pin 22 is further moved into contact with arm 44a of cam follower lever 44 to pivot the latter about pin 45 relative to change lever 40 against the force of spring 46. when arm 44a of cam follower lever 44 is thereby made to overlap arm 40b of change lever 40, claw 44c will then be locked by lock arm 48, and change lever 40 will be thereafter pivoted about pin 39 in the clockwise direction and will be held at the position it occupies when claw 27a of lock lever 27 contacts stopper projection 20a. Thereby, the forward mode with tape drive in the normal direction will be established.

On the other hand, if the stop mode is established at a time when the player is in the forward mode with the tape being driven in the reverse direction, pin 22 on cam gear 19 will be located at the position shown in FIG. 1 after the slight rotation caused by spring arm 30. Then, in response to actuation of forward lever 16, cam gear 19 will be rotated and pin 22 will be moved therewith into contact with arm 44a of cam follower lever 44. By such movement of pin 22, cam follower lever 44 will be locked relative to change lever 40 by lock arm 48 and, therefore, change lever 40 will be held at its pivoted position when cam gear 19 is locked by lock lever 27.

As above described, by reason of the "priority device" function of the apparatus according to this invention, a tape will be driven in the normal direction whenever the forward lever 16 is operated with the player in the stop mode, regardless of the direction in which the tape was driven before establishment of the stop mode.

Although an illustrative embodiment of the present invention has been described in detail herein with reference to the accompanying drawings, it is to be understood that the invention is not limited to that precise embodiment, and that various changes and modifications can be effected therein by one skilled in the art without departing from the scope or spirit of the invention, as defined by the appended claims.

What is claimed is:

1. In a magnetic tape player having a tape drive device selectively operative to drive a tape in normal and reverse directions in a forward mode of the tape player, apparatus for controlling said tape drive device comprising:

a rotatable cam gear having a toothed periphery with a pair of diametrically opposed gaps therein;

a rotatable driving gear engageable with said toothed periphery of the cam gear for turning the latter through approximately 180° upon each engagement of said driving gear with said toothed periphery;

a pair of diametrically opposed stopper projections rotatably coupled with said cam gear;

a latch member mounted adjacent said cam gear and movable between an engaged position, in which said latch member is engageable with one of said stopper projections for positioning said cam gear in a rest position with one of said gaps facing said driving gear, and a released position in which said latch member is disengaged from said stopper projections;

a cam surface on said cam gear having a pair of diametrically opposed, radially enlarged portions;

spring means engaging said cam surface and acting against one of said radially enlarged portions when a respective one of said gaps faces said driving gear for turning said cam gear from said rest position upon movement of said latch member to said released position;

an eccentric member on said cam gear;

a change lever movable between first and second positions for causing operation of said tape drive to drive the tape in said normal and reverse directions, respectively;

a cam follower member engageable with said eccentric member and being pivotally mounted on said change lever;

a spring-loaded lock arm also pivotally mounted on said change lever and being movable between a normal operative position for locking said cam follower member relative to said change lever and an inoperative position in which said cam follower member is free to pivot relative to said change lever;

a forward mode selecting member having an inactive position, in which said lock arm is displaced to said inoperative position thereof, and being movable to an active position for selecting said forward mode and releasing said lock arm to permit the latter to attain said normal operative position; and means responsive to pivoting of said cam follower member by said eccentric member when said lock arm is in said inoperative position for moving said latch member to said released position.

2. A magnetic tape player according to claim 1; in which said inactive position of the forward mode selecting member corresponds to a stop mode of the tape player; and further comprising a pivot arm carrying said driving gear and being movable between an operative position in which said driving gear is engageable with said toothed periphery of the cam gear and an inoperative position in which said driving gear is held away from said toothed periphery; and means responsive to movement of said forward mode selecting member to said inactive position corresponding to the stop mode for moving said latch member to said released position and said pivot arm to said inoperative position.

3. A magnetic tape player according to claim 2; in which, with said lock arm in said normal operative position for locking said cam follower member relative to said change lever, successive turnings of said cam gear through 180° cause movements of said change lever alternately to said first and second positions for driving the tape alternately in said normal and reverse directions, respectively; and further comprising means for detecting an end of the tape being driven; and means responsive to each detection of a tape end while the tape player is in said forward mode for displacing said latch member to said released position and thereby permitting said spring means to turn the cam gear from said rest position whereupon said driving gear engages said toothed periphery to complete turning of said cam gear through 180° for changing the tape drive direction.

4. A magnetic tape player according to claim 3; further comprising retaining means for holding said forward mode selecting member in said active position; and automatic shut-off selecting means actuable to release said retaining means from said forward mode selecting member for return of the latter to said inactive position corresponding to said stop mode of the player in response to said detection of a tape end.

5. A magnetic tape player according to claim 3; further comprising a magnetic head engageable with the tape being driven; and means actuable by said change lever for changing the azimuth of said head in accordance with changing of said tape drive direction.

6. A magnetic tape player according to claim 3; further comprising manually actuable direction changing means operative while the tape player is in said forward mode for momentarily displacing said latch member to said released position and thereby permitting said spring means to turn the cam gear from said rest position whereupon said driving gear engages said toothed periphery to complete turning of said cam gear through 180° for changing the tape drive direction before an end of the tape is detected.

7. A magnetic tape player according to claim 2; further comprising manually actuable direction changing means operative while the tape player is in said forward mode for momentarily displacing said latch member to said released position and thereby permitting said spring means to turn the cam gear from said rest position whereupon said driving gear engages said toothed periphery to complete turning of said cam gear through 180° for changing the tape drive direction.

8. A magnetic tape player according to claim 2; in which said lock arm, in said normal operative position, is engageable with said cam follower member for locking the latter relative to said change lever only when said cam follower member is in a predetermined angular position relative to said change lever; and further comprising means for disposing said change lever in a neutral position between said first and second positions in said stop mode of the tape player; means for urging said cam follower member away from said predetermined angular position relative to said change lever when said lock arm is displaced to said inoperative position in response to said inactive position of the forward mode selecting member; and means on said cam follower member engageable by said eccentric member to return said cam follower member to said predetermined angular position relative to said change lever only as a precursor to movement of said change lever with said cam follower member from said neutral position to said first position, whereby, the tape is always driven first in said normal direction upon the initiation of said forward mode after the tape player has been in said stop mode.

9. A magnetic tape player according to claim 1; in which said lock arm, in said normal operative position, is engageable with said cam follower member for locking the latter relative to said change lever only when said cam follower is in a predetermined angular position relative to said change lever; and further comprising means for disposing said change lever in a neutral position between said first and second positions upon movement of said forward mode selecting member to said inactive position for establishing a stop mode of the tape player; means for urging said cam follower member away from said predetermined angular position relative to said change lever when said lock arm is in said inoperative position; and means on said cam follower member engageable by said eccentric member to return said cam follower member to said predetermined angular position relative to said change lever only at a precursor to movement of said change lever with said cam follower member from said neutral position to said first position, whereby, the tape is always driven first in said normal direction upon the initiation of said forward mode after said stop mode.

10. In a magnetic tape player having a tape drive device selectively operative to drive a tape in normal and reverse directions in a forward mode of the tape player, apparatus for controlling said tape drive device comprising:

a rotatable cam gear having a toothed periphery with a pair of diametrically opposed gaps therein;

a rotatable driving gear engageable with said toothed periphery of the cam gear for turning the latter through approximately 180° upon each engagement of said driving gear with said toothed periphery;

a pivot arm supporting said driving gear and being movable between an operative position in which said driving gear is engageable with said toothed periphery and an inoperative position holding said driving gear away from said toothed periphery;

a pair of diametrically opposed stopper projections rotatably coupled with said cam gear;

a latch member mounted adjacent said cam gear and movable between an engaged position, in which said latch member is engageable with one of said stopper projections for positioning said cam gear in a rest position with one of said gaps facing said driving gear, and a released position in which said latch member is disengaged from said stopper projections;

an eccentric member on said cam gear;

a change lever movable in opposite directions from a neutral position corresponding to an inoperative condition of said tape drive to first and second operative positions for causing operation of said tape drive in said normal and reverse directions, respectively, with the tape player in said forward mode;

means acted upon by said eccentric member for moving said change lever between said first and second operative positions in response to turning of said cam gear through 180°;

a cam gear surface on said cam gear having a pair of diametrically opposed, radially enlarged portions;

spring means engaging said cam surface and acting against one of said radially enlarged portions when a respective one of said gaps faces said driving gear for turning said cam gear from said rest position when said latch member is moved to said released position; and forward mode selecting means movable to an inoperative position in which said latch member is moved to said released position and said pivot arm is moved to said inoperative position.

11. A magnetic tape player according to claim 10; in which, in the forward mode of the tape player, successive turnings of said cam gear through 180° cause movements of said change lever alternately to said first and second positions for driving the tape alternately in said normal and reverse directions, respectively; and further comprising means for detecting an end of the tape being driven; and means responsive to each detection of a tape end while the tape player is in said forward mode for displacing said latch member to said released position and thereby permitting said spring means to turn the cam gear from said rest position whereupon said driving gear engages said toothed periphery to complete turning of said cam gear through 180° for changing the tape drive direction.

12. A magnetic tape player according to claim 11; further comprising retaining means for holding said forward mode selecting member in an active position; and automatic shut-off selecting means actuable to release said retaining means from said forward mode selecting member for return of the latter to said inoperative position corresponding to a stop mode of the player in response to said detection of a tape end.

13. A magnetic tape player according to claim 11; further comprising a magnetic head engageable with the tape being driven; and means actuable by said change lever for changing the azimuth of said head in accordance with changing of said tape drive direction.

14. A magnetic tape player according to claim 11; further comprising manually actuable direction changing means operative while the tape player is in said forward mode for momentarily displacing said latch member to said released position and thereby permitting said spring means to turn the cam gear from said rest position whereupon said driving gear engages said toothed periphery to complete turning of said cam gear through 180° for changing the tape drive direction before an end of the tape is detected.

15. A magnetic tape player according to claim 10; further comprising manually actuable direction changing means operative while the tape player is in said forward mode for momentarily displacing said latch member to said released position and thereby permitting said spring means to turn the cam gear from said rest position whereupon said driving gear engages said toothed periphery to complete turning of said cam gear through 180° for changing the tape drive direction.

16. A magnetic tape player according to claim 10; in which said inoperative position of said forward mode selecting means corresponsd to a stop mode of the tape player; and further comprising means operative when said forward mode selecting means is actuated from said inoperative position to cause driving of the tape first in said normal direction.

* * * * *